United States Patent [19]

Ruckl

[11] Patent Number: 5,662,821

[45] Date of Patent: Sep. 2, 1997

[54] METHOD AND DEVICE FOR PRODUCING A SCREEN PRINTING STENCIL

[75] Inventor: Siegfried Ruckl, Langkampfen, Austria

[73] Assignee: Schablonentechnik Kufstein Aktiengesellschaft, Kufstein, Austria

[21] Appl. No.: 382,799

[22] Filed: Feb. 2, 1995

[30] Foreign Application Priority Data

Feb. 2, 1994 [EP] European Pat. Off. ............... 94101572

[51] Int. Cl.⁶ ..................................................... B23K 26/00
[52] U.S. Cl. .................. 219/121.67; 219/121.72; 492/4
[58] Field of Search .................... 219/121.72, 121.68, 219/121.69, 121.67, 121.84; 492/4, 18

[56] References Cited

U.S. PATENT DOCUMENTS

| | | | |
|---|---|---|---|
| 3,574,912 | 4/1971 | Kraft | 492/4 |
| 3,707,749 | 1/1973 | Henley | 492/4 |
| 4,272,872 | 6/1981 | Hess et al. | 492/4 |
| 4,878,127 | 10/1989 | Zollman et al. | 219/121.68 |
| 5,198,636 | 3/1993 | Suchan | 219/121.68 |
| 5,386,097 | 1/1995 | Rückl | 219/121.68 |

FOREIGN PATENT DOCUMENTS

| | | | |
|---|---|---|---|
| 0320137 | 6/1989 | European Pat. Off. | |
| 0338612 | 10/1989 | European Pat. Off. | |
| 562150 | 9/1993 | European Pat. Off. | 219/121.68 |
| 2417033 | 9/1979 | France | |
| 2902902 | 1/1979 | Germany | |
| 3601327 | 8/1986 | Germany | |
| 52-69091 | 6/1977 | Japan | 219/121.68 |
| 61-17391 | 1/1986 | Japan | 219/121.72 |
| 62-21496 | 1/1987 | Japan | 219/121.84 |
| 2-99287 | 4/1990 | Japan | 219/121.85 |
| 93/10939 | 6/1993 | WIPO | 219/121.69 |

Primary Examiner—Geoffrey S. Evans

[57] ABSTRACT

A screen printing stencil is produced by irradiating a light responsive layer situated on the surface of a rotating screen printing cylinder in a punctiform fashion by means of a laser beam which impinges at least approximately radially on the screen printing cylinder and is moved in the radial direction thereof. The screen printing cylinder is supported only in the region of its opposite end faces, while it is inflated so strongly over at least one of these end faces by means of a compressed gas that it assumes a circular cross-section. If the circumferential surface of the screen printing cylinder is opened by burning away the light responsive layer, sealing elements can be blown into the screen printing cylinder in order to seal the cylinder in the region of its exposed perforation.

16 Claims, 5 Drawing Sheets

METHOD AND DEVICE FOR PRODUCING A SCREEN PRINTING STENCIL

BACKGROUND OF THE INVENTION

1. Field of the Invention

The invention relates to a method and to a device for producing a screen printing stencil by rotating a screen printing cylinder to irradiate a light responsive layer thereon.

2. Description of Related Art

It has already been disclosed in DE 36 01 327 A1 to make use for the purpose of forming a thin screen printing stencil, in particular for textile printing, of a screen printing cylinder which is, for example, produced galvanoplastically, is extremely thin-walled, is made from, for example, pure nickel and has a multiplicity of small passage openings. This uniformly perforated screen printing cylinder bears on its outer surface a thin lacquer layer which seals its passage openings. In order to obtain a desired printing pattern, the surface of the screen printing cylinder is partially exposed in a dedicated operation, specifically by removing the lacquer layer situated on it. In this operation, use is made of a laser which either burns off or evaporates the lacquer at the points to be exposed, or initially crosslinks or polymerizes by intensive exposure a photosensitive or photopolymerizable lacquer of a different type. There are also lacquers whose cohesive power is so far damaged by the intensive effect of light that they can be removed from the exposed points by means of a subsequent chemical after-treatment.

The laser beam is focussed onto the lacquer layer and switched on and off very rapidly, often up to a few million times per second, it being simultaneously displaced relative to the lacquer surface, and so the total result of exposing the small focal spots is to produce the desired pattern of the screen printing stencil.

Normally, the screen printing stencil rotates relatively quickly, for example at 1,500 revolutions per minute, it being the case that the focal spot of the laser beam which impinges at least approximately radially onto the screen printing cylinder is simultaneously displaced in the axial direction of the screen printing cylinder, with the result that the focal spot on the surface of the screen printing cylinder moves along a helix. The lead of the helix corresponds approximately to the diameter of the focal spot, or is slightly smaller. The entire process is controlled by a fast computer, which is respectively aware of the circumferential and axial positions of the focal spot through interrogating appropriate sensors, with the result that the individual exposures are correctly added to an overall pattern.

The screen printing cylinder bearing the lacquer layer on its surface is pushed for the purpose of producing a pattern onto an expandable, exactly concentric clamping cylinder, but this is relatively complicated. If, in addition, screen printing cylinders of different diameter are to be processed, it is also necessary in the case of relatively large deviations in diameter to change the relatively heavy and unwieldy clamping cylinder.

Furthermore, DE 29 02 902 A1 has disclosed the production of a screen printing stencil by applying to a metallic cylindrical screen coated with a photosensitive photo-resist a film to which the photo-resist is exposed. The metallic cylindrical screen is supported at both its end faces by centering flanges which form, together with the cylindrical screen, a pressure chamber into which a pressure medium is introduced in order to clamp the cylindrical screen by applying pressure. Thereafter, the already mentioned film is laid onto the outer surface of the cylindrical screen thus treated, and exposed. The reason for clamping the cylindrical screen is to increase its natural stability, which normally is not sufficient when surface processing is undertaken on the outside of the cylinder, for example mechanical or photographic designing. A relatively high dimensional stability is required for such work.

SUMMARY OF THE INVENTION

The object of the invention is to develop the method of the type mentioned at the beginning in such a way that simpler manipulation of the screen printing cylinder is possible, specifically without loss of engraving quality.

These and other objects of the present invention may be achieved by providing a process for manufacturing a screen printing stencil, in which a lacquer layer situated on the surface of a rotating screen printing cylinder is irradiated in a punctiform fashion by means of a laser beam which impinges at least approximately radially on the screen printing cylinder and is moved in the axial direction thereof. The screen printing cylinder is supported only in the region of its opposite end faces and is inflated so strongly over at least one of these end faces by means of a compressed gas that it assumes a circular cross-section.

These and other objects of the present invention may be achieved by providing an apparatus in which the clamping device consists of only two centering flanges of which in each case one can be inserted into one of the end faces of the screen printing cylinder, and in that the screen printing cylinder is connected via an internal duct in at least one of the centering flanges to a gas delivery device which generates a gas pressure in the interior of the screen printing cylinder such that the latter assumes a circular cross-section.

According to one embodiment of the invention, compressed gas can also be blown into the screen printing cylinder via both end faces, air, for example, being used as the compressed gas.

Investigations relating to the concentricity of thin metallic cylindrical screens have led to the surprising result that, despite material stresses, which occur, for example, more or less randomly in the case of electrical production of thin-walled nickel stencils, it is possible to form these cylindrical screens by means of suitable internal pressure to be exactly circular such that during exposure of the lacquer layer situated on the screen the focus of the laser beam always remains in the region of the lacquer layer when the screen printing cylinder rotates. Static form variations of the screen printing cylinder can thus be very largely compensated, with the result that very good engraving results are obtained even when during exposure with the aid of a laser beam the screen printing cylinder does not rest over its entire length on a stencil clamping roller.

When the process according to the invention is employed, there is, moreover, a substantial simplification in the handling of the screen printing cylinder, since it now no longer needs to be pushed onto a stencil clamping roller and the mounting of the stencil clamping roller can itself likewise be eliminated. All that remains necessary is to place the screen printing cylinder onto the centering flange and fill it with compressed gas, and this can be done relatively quickly and conveniently.

In a development of the invention, the lacquer layer can be burnt away with the aid of the laser beam, in order partially to expose a perforation of the screen printing cylinder for the purpose of producing a pattern.

It has emerged that contrary to the received view it is possible after all to guarantee a circular cross-sectional formation of the screen printing cylinder by suitable application of pressure even when the cylinder is partially reopened in the region of its circumference because of the burnt-away lacquer layer. A reason for this may reside in the fact that the initial application of pressure at an instant when the cylinder is still closed at least partially already ensures a reduction in the internal material stress, with the result that the pressure loss bound up with the subsequent opening of the screen printing cylinder is no longer so obvious and in any case does not lead to destruction of the circular cylindrical cross-section previously obtained.

In addition, it can be provided according to the invention to feed a larger quantity of compressed gas to the screen printing cylinder as the opening thereof increases. As a result, the pressure loss occurring as a consequence of the opening of the screen printing cylinder can be compensated at least partially.

According to a very advantageous embodiment of the invention, sealing elements are blown into the screen printing cylinder by means of the compressed gas in order to seal the cylinder in the region of its exposed perforation. These sealing elements can be laminated or spherical elements, which can also be constructed as light-reflecting elements. These can be, for example, small sections of paper, plastic or metal foil which are constructed to be round or polygonal. The sections can consist, for example, of aluminium, or nickel metallized plastic foil. Foam plastic balls, for example, made from expanded polystyrene, PU foam, or from foamed ceramic, are also possible. All the balls can also be metallized on their surface. It is essential that the sealing elements are not fused by the laser beam and do not bond the inner surface of the stencil.

If the screen printing cylinder is opened by partially burning away the lacquer layer, the sealing elements are entrained by the flow of compressed gas exactly to where the openings in the screen printing cylinder are formed, in order to seal these once again from inside. The working pressure in the interior of the screen printing cylinder can be kept constant in this way as well. Furthermore, it can be provided according to the invention that in addition to the sealing elements a liquid or pulverulent medium is blown into the screen printing cylinder, in order to thereby finally also to seal regions between the sealing elements. This leads to a still better maintenance of constant pressure in the interior of the screen printing cylinder. A liquid which can be evaporated, for example water, is preferably used as the liquid sealing medium.

According to another very advantageous development of the invention, after production of the pattern the sealing elements and, as the case may be, the liquid or pulverulent medium are once again sucked out and/or blown out of the screen printing cylinder. It is guaranteed as a result that a screen printing stencil which is also clean inside can be removed from the engraving apparatus after termination of the engraving work.

As already mentioned, according to the invention the engraving apparatus has two centring flanges of which in each case one can be inserted into one of the end faces of the screen printing cylinder. The screen printing cylinder is connected via an internal duct in at least one of the centring flanges to a gas delivery device which generates a gas pressure in the interior of the screen printing cylinder such that the latter assumes a circular cross-section. In this case, the gas delivery device can deliver a constant quantity of compressed gas or a continuously increasing quantity of compressed gas in agreement with the continuously increasing circumferential opening of the screen printing cylinder as a consequence of the burning-away of the lacquer layer.

The screen printing cylinder can also, however, be connected via internal ducts in both centering flanges to in each case one gas delivery device, with the result that compressed gas can be blown into it from both ends.

According to a particularly advantageous embodiment of the apparatus according to the invention, there is situated in the flow path between the gas delivery device and the screen printing cylinder a reservoir in which there are located sealing elements which are entrained by the delivered gas flow into the screen printing cylinder. The sealing elements are firstly welled up by the delivered gas flow and transported into the interior of the screen printing cylinder, in order to be deposited precisely at those points at which the screen printing cylinder is opened by burning off the lacquer layer. In this case, sealing elements can also be inserted into the screen printing cylinder from both end faces thereof.

In a still further embodiment of the invention, a feeder device is provided between the reservoir and the screen printing cylinder in order to add to the generated compressed gas flow a liquid or pulverulent sealing medium which is entrained by the flow to the screen printing cylinder. Gaps existing between already deposited sealing elements can be sealed by this medium, and this leads to better maintenance of constant pressure in the interior of the screen printing cylinder, as already mentioned. Of course, this sealing medium can also be introduced into the cylinder through both end faces thereof.

In order to be able to clean the screen printing cylinder after termination of the engraving work, the delivery direction of the gas delivery device can be reversed. The sealing elements can be transported back into their resevoir by the gas flow now being delivered, and with them the pulverulent medium, which is likewise deposited in the reservoir, and, as the case may be, can be filtered out. If the sealing medium is an evaporating liquid, this evaporates in the course of time.

BRIEF DESCRIPTION OF THE DRAWINGS

The invention is described in more detail below with reference to the drawing in which.

DETAILED DESCRIPTION

Figure 1:
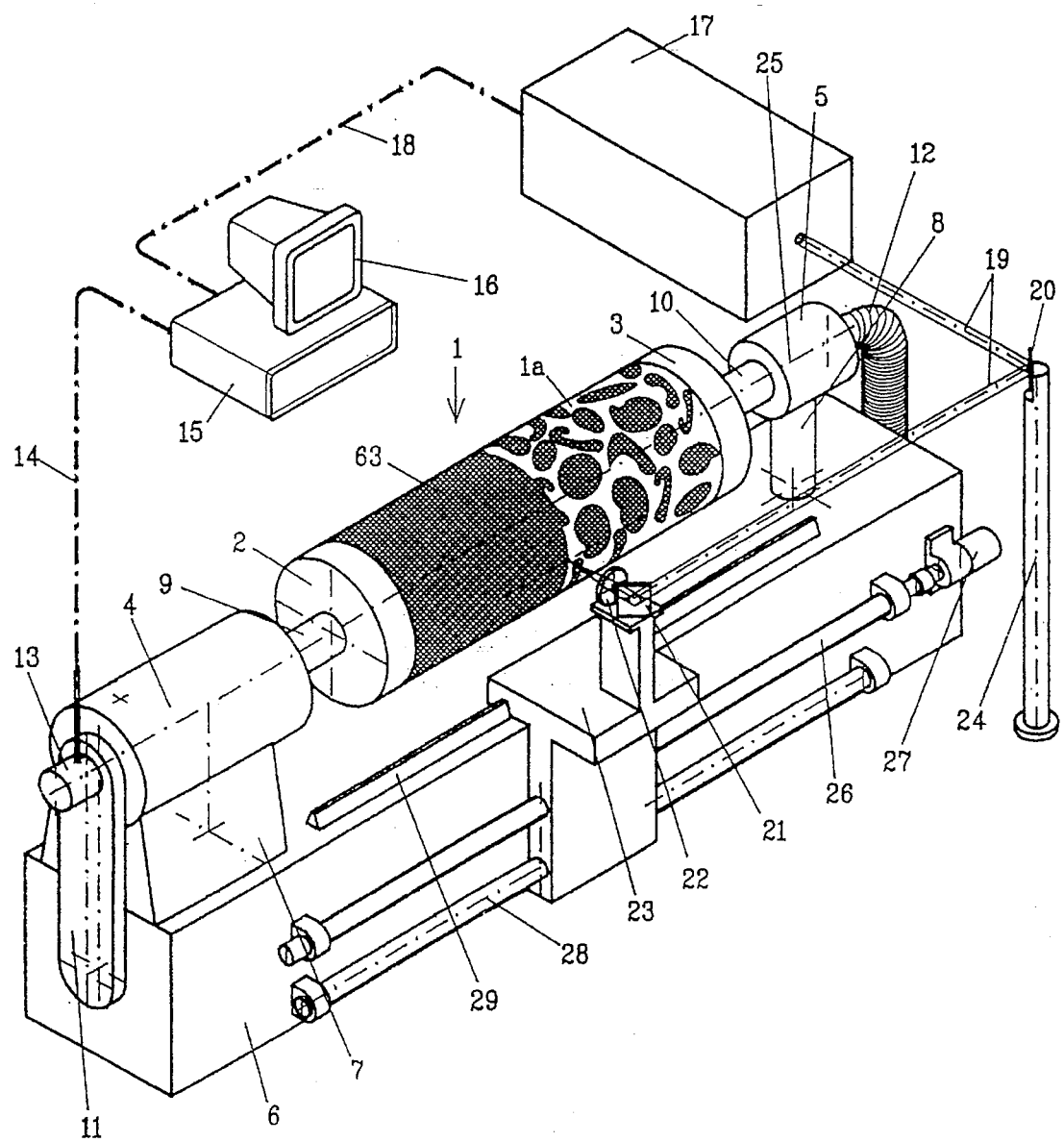
FIG. 1 shows an exemplary embodiment of an apparatus for manufacturing a screen printing stencil.

FIG. 1 shows a perspective view of an apparatus according to the invention for manufacturing a screen printing stencil.

A screen printing stencil 1 is held at its mutually opposite end faces by in each case one clamping head 2 or 3, which can be constructed as centering flanges. These clamping heads 2, 3 are respectively rotatably mounted in a bearing shell 4, 5. The bearing shells 4, 5 are supported on a machine bed 6, specifically via support devices 7, 8.

A hollow shaft section 9 connected to the left-hand clamping head 2 extends into the bearing shell 4 and is rotatably mounted there. This hollow shaft section 9 is set rotating via a drive chain which runs through the support device 7 up to a drive motor which is arranged in the machine bed 6. When the hollow shaft section 9 rotates, it drives the clamping head 2, with the result that the screen printing stencil 1 is thereby set rotating. The other clamping head 3 rotates freely and is mounted in the bearing shell via a hollow shaft section 10.

The two hollow shaft sections 9 and 10 end in the region of the clamping heads 2 and 3, respectively, that is to say do not extend into the screen printing stencil 1, and are, furthermore, connected sealingly to flow ducts 11 and 12 at their ends averted from the clamping heads 2, 3.

Via a control line 14, a shaft encoder 13 connected to the free end of the hollow shaft section 9 informs a computer 15 with an associated monitor 16 of the respective rotary position of the screen printing stencil 1. In this case, the computer 15 sends appropriate switch-on or switch-off pulses to a laser 17 via a control line 18. A laser beam 19 of the laser 17 is emitted or not emitted in accordance with these switch-on and switch-off pulses, respectively. Via a first deflecting mirror 20, the laser beam 19 is fed to a second deflecting mirror 21 which is mounted together with a focussing lens 22 on a moveable carriage 23. The moveable carriage 23 is supported, as explained later, indirectly on the machine bed 6, which stands on the ground, for example, just like a post 24 for holding the first deflecting mirror 20.

In the region between the first deflecting mirror 20 and the second deflecting mirror 21, the laser beam 19 extends parallel to the longitudinal axis 25 of the screen printing stencil 1 and is deflected by the second deflecting mirror 21 in such a way that it impinges at least approximately radially on the screen printing cylinder 1a. In this case, it is focussed onto the lacquer layer 63 by means of the focussing lens 22.

The moveable carriage 23 can be displaced in the direction of the longitudinal axis 25 of the screen printing stencil 1. This displacement is effected by a spindle 26 and a motor 27 which drives this spindle. A round guide 28 and a prismatic guide 29 ensure a movement of the carriage 23 which is exactly parallel to the longitudinal axis 25 of the screen printing stencil 1. In this case, the prismatic guide 29 is located on the upper surface of the machine bed 6, while the spindle 26 and the round guide 28 are arranged parallel to one another on the front of the machine bed 6.

As will be described more precisely, located inside the machine bed 6 are gas delivery devices of which respectively one is connected to one of the flow ducts 11 and 12. A compressed gas can be blown into the interior of the screen printing stencil 1 by these gas delivery devices via the flow ducts 11, 12, the hollow shaft sections 9, 10 and the clamping heads 2, 3.

The motor 27 for driving the spindle 26 is preferably a stepping motor, with the result that it is also possible to determine the axial position of the laser beam 19 impinging on the screen printing cylinder 1a by means of the drive pulses for the stepping motor 27.

Figure 2:
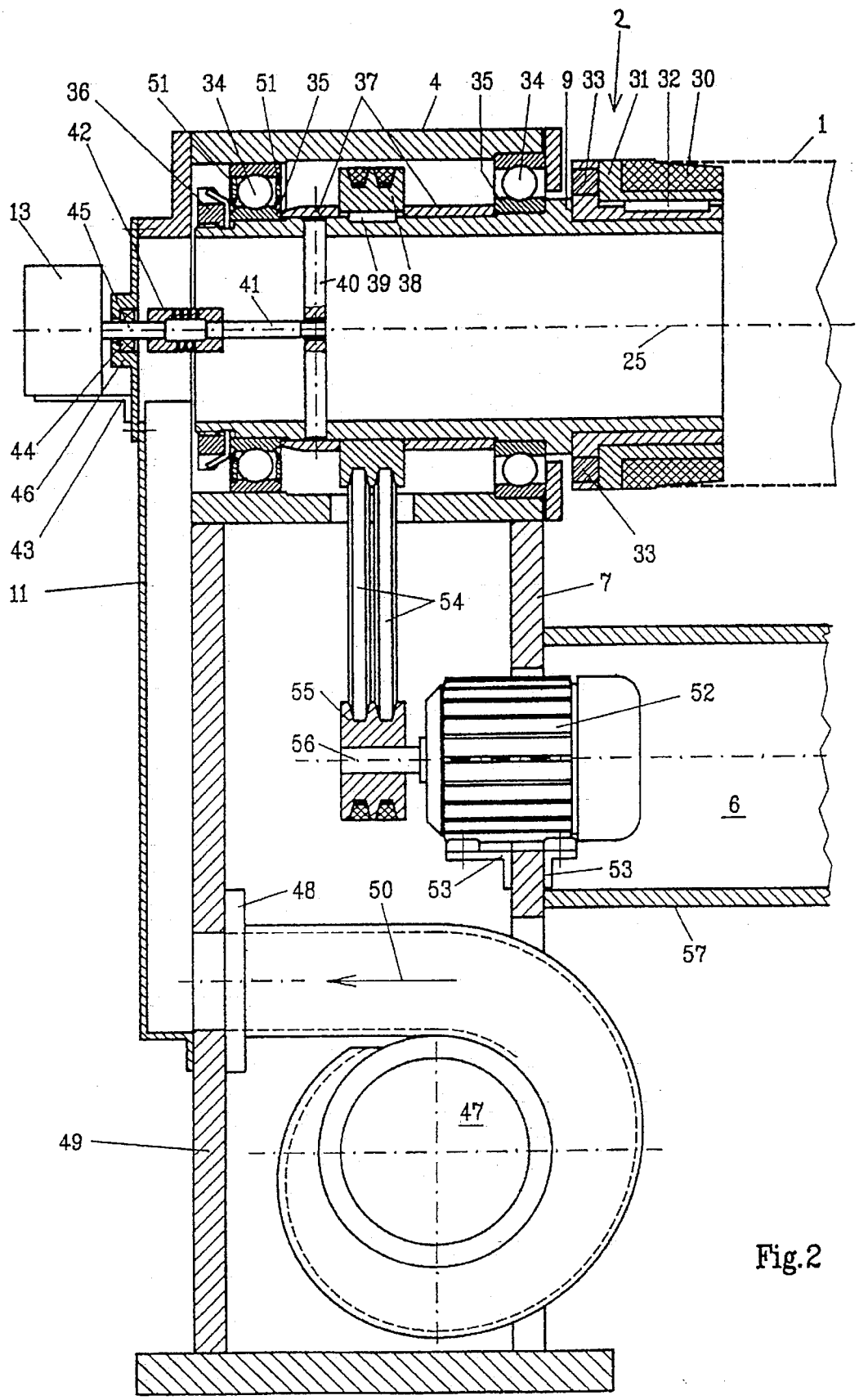
FIG. 2 shows the detailed construction of the apparatus according to FIG. 1 at the left-hand end face of the screen printing stencil.

FIG. 2 shows in a detailed exposition the structure of the engraving apparatus according to FIG. 1 in the region of the end of the screen printing cylinder 1a on the left-hand side there. This region can also be designated as the spindle-head-side region of the engraving apparatus. Elements identical to those in FIG. 1 are provided with identical reference symbols.

The screen printing stencil 1 is pushed with its left-hand end onto a slightly tapered driving ring 30 which belongs to the clamping head 2. The driving ring 30 is exchangeable, and for this purpose is permanently connected to a sleeve 31 which for its part is accommodated by the hollow shaft section 9 by means of a fitted key connection 32. Magnets 33 hold the sleeve 31 in the axial direction. The hollow shaft section 9 is rotatably supported via ball bearings in the spindle head housing 4 (bearing shell). The ball bearings 34 are clamped against the hollow shaft section 9 with their inner rings 35 by means of a grooved nut 36 and distancing sleeves 37. A V-belt drive pulley 38 is provided between the distancing sleeves 37, a fitted key 39 ensuring the transmission of a driving torque to the hollow shaft section 9. A driving pin 40, which is connected in a rotationally rigid fashion to the hollow shaft section 9 via a transverse bore therein, drives the shaft encoder 13 via a shaft 41 and a flexible coupling 42. The shaft encoder is supported on an angle 43 which is mounted on the side of the flow duct 11. A shaft seal ring 44 ensures a tight closure of the shaft stock 45 projecting from the shaft encoder 13. The shaft seal ring 44 is located in a wall 46 which forms a wall section of the flow duct which is situated between the flow duct 11 and the hollow shaft section 9.

Via the flow duct 11 on the left-hand outside surface of the machine bed 6 or the support device 7, compressed air is transported from a fan 47 to the left-hand end face of the hollow shaft section 9 and directed through the latter into the screen printing stencil 1. The fan 47 supplies air with a pressure of up to a few ten thousand Pa and this is done in a quantity so large that despite the escape of this air from the openings of the screen printing stencil 1, which are exposed during the engraving work, the pressure inside the stencil remains sufficiently high. In this case, the fan 47 is located in the interior of or below the machine bed 6 and is connected via a flange 48 to the side wall 49 of the machine bed. The arrow 50 indicates the direction of flow of the air.

So that no pressure loss can occur in the region of the ball bearings 34, the latter can have sealing side walls 51.

The motor already mentioned bears the reference symbol 52 and is mounted on a support device 53 inside the machine bed 6. This motor 52 drives the hollow shaft section 9 via V-belts 54 which wrap around the V-belt drive pulley 38. In this case, the V-belts also run around a further V-belt pulley 55 which is seated on the shaft 56 of the motor 52.

A box girder 57 connects the left-hand end on the engraving device to its right-hand end. In this case, the cross-section of the box girder 57 is constructed to be so large that the engraving device has a satisfactory rigidity and a low susceptibility to vibrate.

Figure 3:
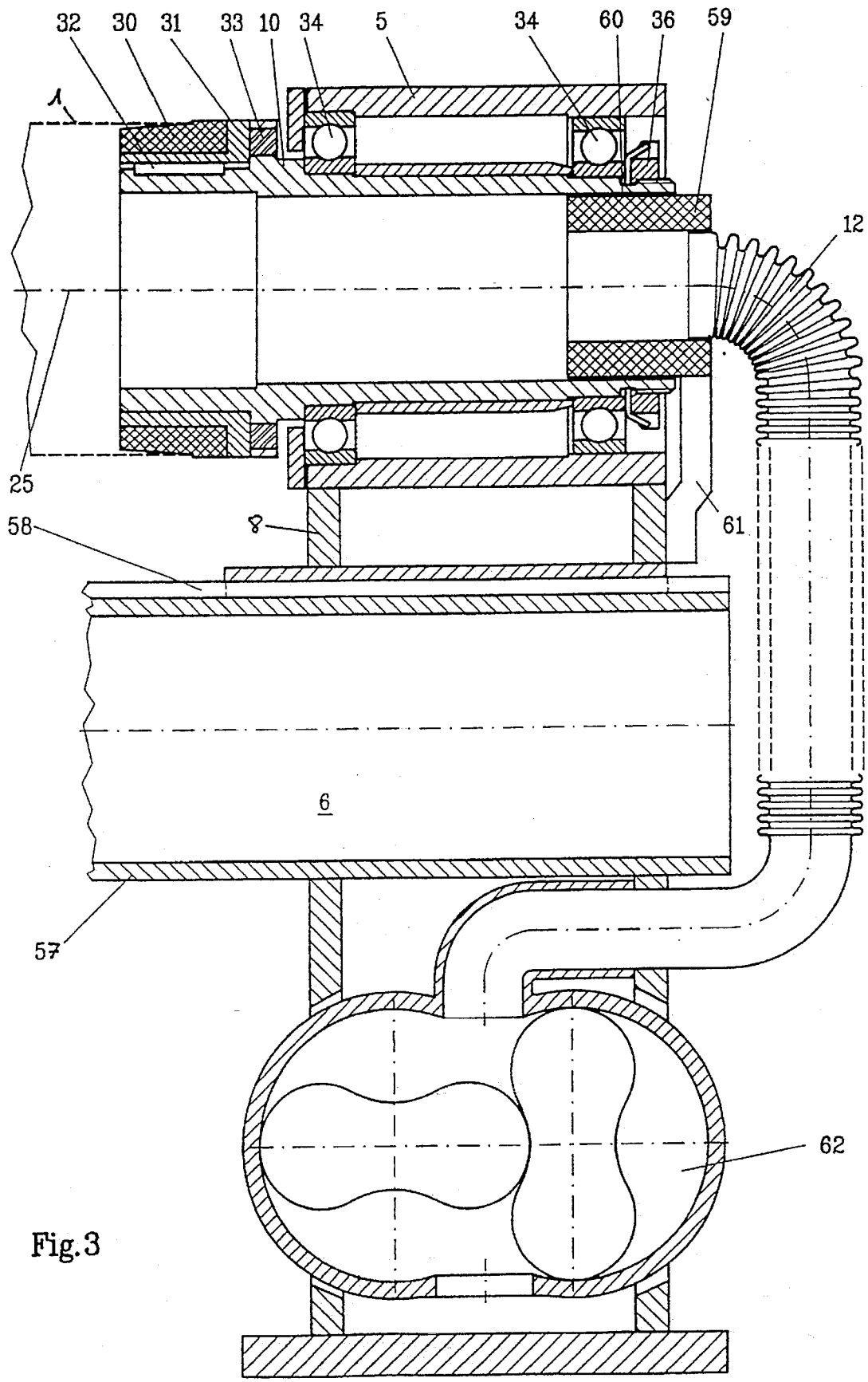
FIG. 3 shows the detailed construction of the apparatus according to FIG. 1 at the right-hand end face of the screen printing stencil.

FIG. 3 shows a section through the right-hand tailstock-side end of the engraving device according to FIG. 1. Parts identical to those in FIGS. 1 and 2 are provided, once again, with the identical reference symbols.

The tailstock 5 (right-hand bearing shell) can be displaced on guides 58 which are situated on the machine bed 6 or box girder 57 and extend parallel to the longitudinal axis 25. When setting up the engraving device, the tailstock 5 is pushed so far against the screen printing stencil 1 that the tapered driving ring 30 is seated firmly in the screen printing stencil 1. By means of a clamping device (not further represented), the tailstock 5 is clamped in the region of its support device 8 against the guides 58 or the box girder 57 with the result that during operation it is impossible for the tailstock 5 to loosen and slip. Air under increased pressure is fed on this side of the screen printing stencil 1 via a sliding bushing 59 which is sealed with respect to the hollow shaft section 10 by means of a long and thin gap 60. The non-rotatable part of the sliding bushing 59 is supported by a holder 61 which is permanently connected to the tailstock 5 or the support device 8. Via a long flexible hose 12, air is fed by a rotary piston fan 62 (Roots fan) to the interior of the screen printing stencil 1, specifically through the sliding bushing 59 and the hollow shaft section 10. It is expedient here to use annular chamber, water ring or rotary piston fans to supply the compressed air.

Figure 4:
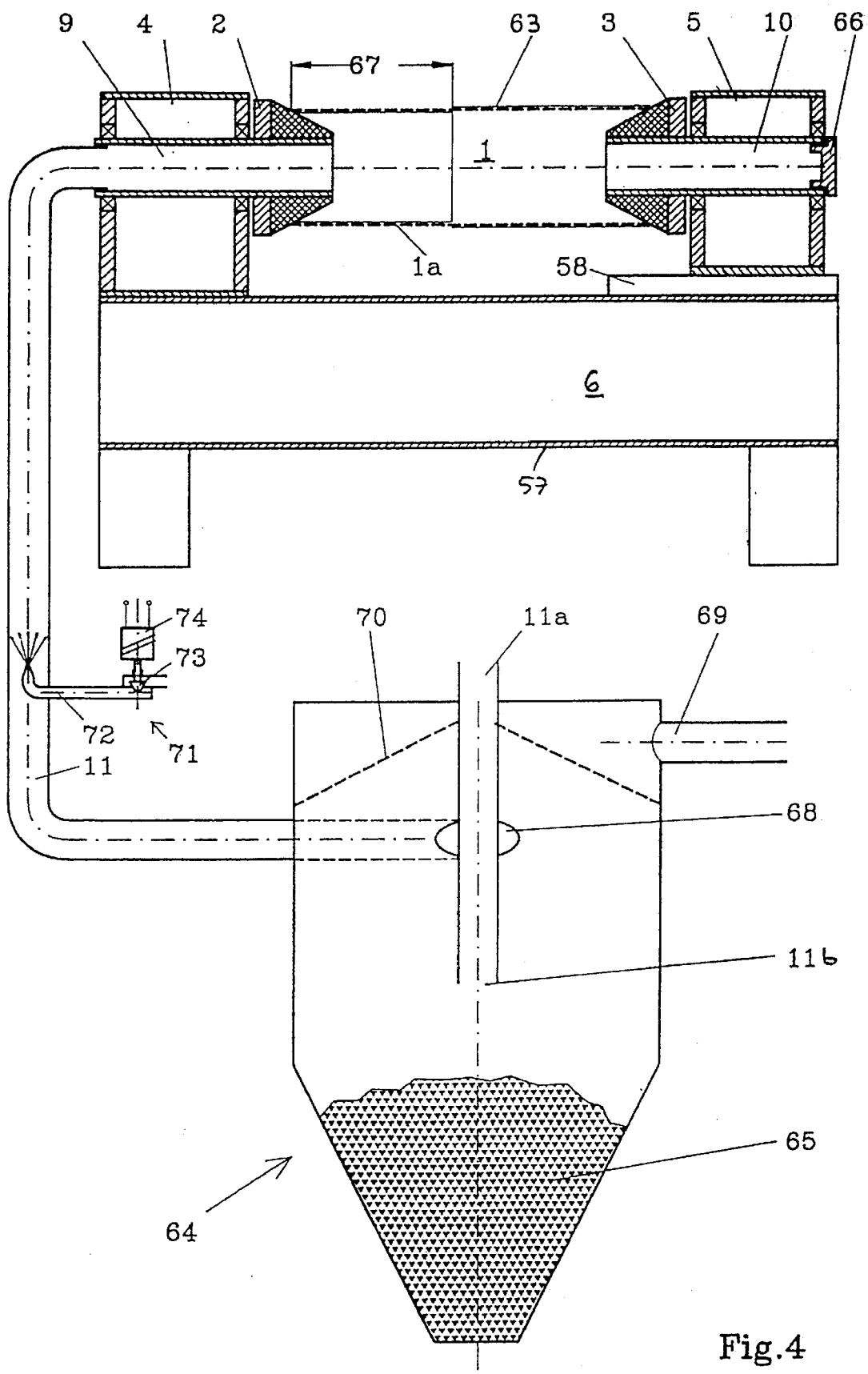
FIG. 4 shows a diagrammatic representation of an engraving apparatus with a connected reservoir for sealing elements and a further feed device for a liquid sealing medium.

FIG. 4 shows a diagrammatic representation of a device according to the invention, in which there is situated in the flow path between the gas delivery device and the screen printing cylinder a reservoir in which sealing elements are located which are entrained in the screen printing cylinder by the gas flow delivered.

According to the invention, the interior of the screen printing stencil 1 is continuously sealed off by small sealing or covering elements inside the region processed by the laser beam. The sealing elements can be, for example, small paper, plastic or metal foil sections. The sealing elements can consist in the manner of confetti of small round or quadrilateral pieces. Paper has the advantage in this connection of being inexpensive. However, there is the danger that that component of the laser radiation which passes through the stencil openings will likewise perforate the internal paper coating, as a result of which the efficiency of the sealing would be reduced. For this reason, it can be more advantageous to use thin and reflecting metal sections, for example, made from aluminium or nickel, which retroreflect the laser radiation just like the nickel sleeve and the screen printing cylinder which bears the external lacquer layer.

In FIG. 4, the screen printing cylinder is once again provided with the reference symbol 1a, while the lacquer layer bears the reference symbol 63. The use of thin but metallized, and thus reflecting plastic film as sealing element can also be taken into consideration. Another possibility is to seal the openings of the stencil cylinder with small foam plastic balls made from expanded polystyrene, PU foam (polyurethane foam) or from foamed ceramic. These balls can also bear a metallic surface coating. It is important that the sealing elements, which could otherwise rebond the stencil surface freed from the external lacquer layer 63 by the laser beam are not fused.

A further measure can consist in lightly moistening the sealing elements by means of an evaporatable liquid, for example water, in order to seal off still further the very narrow flow capillaries remaining between the sealing elements. It is possible in this way to guarantee an even better constancy of the internal pressure in the screen printing cylinder 1a.

According to FIG. 4, the engraving is to start from the left-hand side of the screen printing cylinder 1a, that is to say from the side of the spindle head 4. In this case, it continues to the right in the direction of the tailstock 5. The screen printing stencil 1 is intended in this case to be freed of the external lacquer layer 63 in accordance with the requirements of the pattern. The layer 63 may by any light responsive material which has a physical property thereof altered when light impinges upon it. In this arrangement, the screen printing stencil 1 is situated between a left-hand, tapered clamping head 2 on the spindle-head side and a right-hand and tailstock-side, tapered clamping head 3, and is entrained via frictional grip by the left-hand clamping head 2, that is to say set rotating. Fan air under increased pressure is blown through the hollow shaft section 9 into the interior of the screen printing stencil 1. In the case of very large and long screen printing stencils, it is also possible for fan air to reach the interior of the screen printing cylinder 1a through the hollow shaft section 10 which is located in the tailstock 5. Air is fed to the screen printing stencil 1 by the fan only when fed air can also escape from the screen printing stencil 1. The escape takes place through the points of the stencil lateral surface which are not yet covered on the inside and which have just been freed from the external lacquer layer 63 by the laser beam, or through the capillaries remaining between the sealing elements. The air flow in the interior of the screen printing stencil 1 will at any rate lead precisely to those points through which a substantial escape of air takes place, and this can be used for targeted application of the sealing elements. All that is required is to install a reservoir 64 for the sealing elements in the course of the flow duct 11. A number of further sealing elements 65 is dispensed into the flow from this reservoir 64 whenever a stronger flow is set up through the screen printing stencil 1 by the exposure of openings in the screen printing cylinder 1a. In the exemplary embodiment shown here, the screen printing stencil 1 is so short that it is possible to eliminate feeding air from both ends. The hollow shaft section 10 in the tailstock 5 is therefore sealed by a cap 66. Air can now escape to the outside from the screen printing cylinder 1a only in the region 67 in which the lacquer layer 63 has already been removed.

After termination of the engraving work, the sealing elements 65 must be removed again from the screen printing stencil 1, and at best be conveyed back into the reservoir 64, so that they are available there for the next engraving operation. Normally, this is done by reversing the direction of flow, that is to say air is now sucked out of the stencil. In the case of screen printing stencils engraved over a sufficiently large area, so much open circumferential area is available that only a slight underpressure is thereby produced in the stencil and this pressure is also not sufficient to buckle the stencil under the influence of the external overpressure then present. The flow rate is then also so high that the sealing elements can be carried back into the reservoir 64 by the air flow.

Only in the case of screen printing stencils which are little exposed, that is to say which are engraved only in small surface regions, can it occur that a relatively large overpressure is present during the resuction phase on the outside of the screen printing stencil as against the inside. The flow rate can then also be so low that it is no longer possible to return the sealing elements into the reservoir 64 because of the excessively weak bearing effect of the flow. In this case, the hollow shaft section 10 in the tailstock 5 is opened by removing the cap 66, as a result of which an adequate flow through the screen printing stencil 1 is ensured. It is obvious that in the case of feeding fan air to the screen printing stencil 1 from both ends, fan air can continue to be fed through the tailstock 5 during the resuction phase, so that in this embodiment, as well, an adequate internal pressure in the screen printing stencil and an adequate flow rate for conveying the sealing elements back, now through the hollow shaft section 9, are ensured.

The reservoir 64 is constructed in the manner of a cyclone dust extractor. The flow duct 11, coming from the hollow shaft section 9, opens into an opening 68 in the upper third of the reservoir 64, approximately tangentially into the latter. The stock of sealing elements 65 is located in the lower part of the reservoir 64, that is to say in the tapered part. During the engraving phase, air is blown into the reservoir 64 through the flow duct 11a, the flow duct 11a approaching the stock of sealing elements 65 vertically. The flow duct 11a thus extends concentrically with the central axis of the reservoir 64 and points to the floor thereof. The free end of the flow duct 11a outside the reservoir 64 is connected, for example, to the fan 47, in FIG. 2. The free jet forming from the end 11b of the flow duct 11a impinges on the surface of the sealing element stock and curls upwards from there the light sealing elements 65 which are then entrained or carried along by the flow and, via the flow duct 11 and the hollow shaft section 9 reach the interior of the screen printing stencil 1, where they seal the screen printing stencil 1 in the way already described. In this case, the free jet can form in the interior of the reservoir 64 only when air flows in sufficient quantity through the flow duct 11a. If the interior of the screen printing stencil 1 is already so well sealed that no appreciable flow is present, neither does any free jet form in the interior of the reservoir 64, and no sealing elements 65 are entrained nor therefore also carried into the screen printing stencil 1.

During the resuction base, air is sucked from the reservoir 64 via a resuction duct 69. Provided in the interior of the reservoir 64 is a frustoconical sieving screen 70 which, starting from the flow duct 11a, is inclined downwards in the direction of the wall of the reservoir 64. Because of its dimensioning over a large area, this sieving screen 70 has the effect that the air flows very uniformly and slowly in its region. Since the sealing elements 65 can no longer be carried by the air in the case of a slow flow of air, the sealing elements 65 fall downwards in the reservoir 64. The tangential opening of the flow duct 11 into the reservoir 64 has the effect, in addition, of forming an eddying flow in the reservoir 64 during the resuction phase, thus supporting the deposition of the sealing elements 65. The eddying flow flings the sealing elements 65 to the edge of the reservoir 64. Since because of the wall friction the vertical flow component is particularly small there, the sealing elements 65 preferentially fall downwards here into the stock region under the influence of gravity.

A feed device 71 can be present between the reservoir 64 and the hollow shaft section 9, in order to add a liquid medium or a pulverulent medium of the flow to the screen printing cylinder 1a. If water is to be fed, a conduit 72 having a nozzle ends in the flow duct 11. A valve 73 is opened and closed as required by an electromagnetic valve drive 74. In the case of feeding a pulverulent sealing medium into the flow duct 11, it is possible, for example, for a screw (not represented) to take over the transport of the pulverulent medium, the screw coming to be situated inside a transport duct which opens into the flow duct 11.

Figure 5:
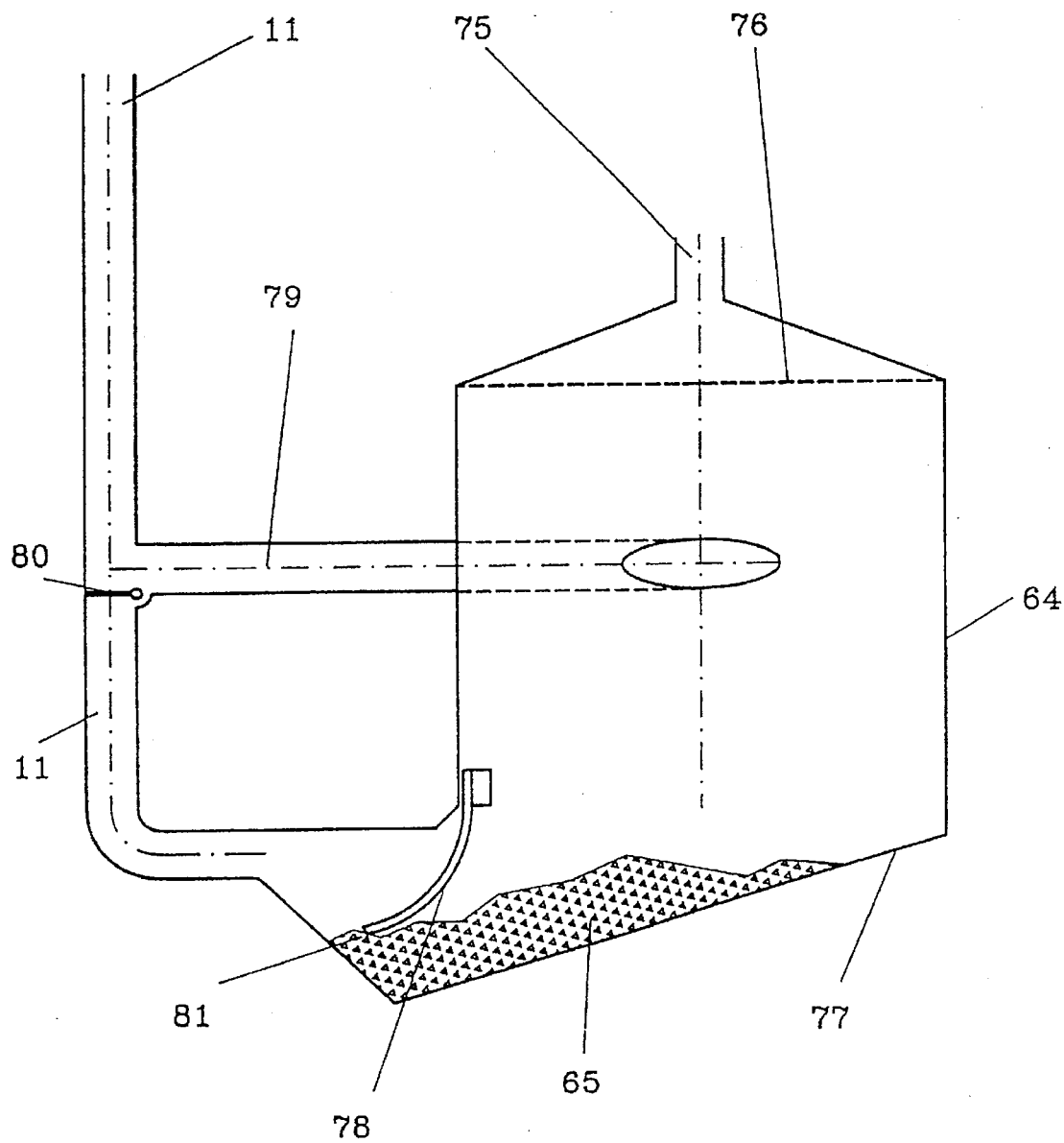
FIG. 5 shows the construction of a further reservoir for sealing elements.

FIG. 5 shows a somewhat different design of a reservoir 64 for sealing elements 65. Here, during the engraving phase air flows into the reservoir 64 through a vertically extending flow duct 74. The effect of a horizontally situated sieving screen 76 in the reservoir 64 is a slow and uniform flow through the reservoir 64, on the floor of which the sealing elements 65 are located. Owing to an oblique arrangement of a floor plate 77, the sealing elements 65 preferably slip into the left-hand region of the reservoir 64, where a flexible skirt 78 is located. During the engraving phase, a duct 79, which opens tangentially into the reservoir 64, is closed by a flap 80. If it is passed through by the screen printing stencil (no longer represented here), the air from the duct 75 must then flow through a very narrow duct 81, which is flexibly sealed by the skirt 78, with the result that the air here has a correspondingly high speed. Consequently, the light sealing elements 65 can be welled up here and transported into the screen printing stencil 1 via the duct 11 already mentioned.

The duct 79 also opens into the flow duct 11, but as already mentioned it is now sealed by the flap 80. During the resuction phase, the flap 80 opens the duct 79 and seals the lower part of the flow duct 11, which is connected to the lower end of the reservoir 64. During the resuction phase, an eddying flow is again produced, whose vertical flow component is, however, only very small, with the result that sealing elements 65 flung against the wall of the reservoir 64 fall slowly to the floor and collect in turn in the region of the flexible skirt 78. Thus, during the resuction phase, the sealing elements 65 flow downwards through the duct 11, are deflected by the flap 80 in the direction of the duct 79 and then reach the reservoir 64.

Here, as well, the previosuly mentioned feed device 71 for liquid or pulverulent sealing medium can be present in the region of the flow duct 11 above the flap 80.

I claim:

1. A method for producing a screen printing stencil comprising:

situating a light responsive layer on the surface of a rotating screen printing cylinder;

irradiating the light responsive layer in a punctiform fashion by means of a laser beam which impinges at least approximately radially on the screen printing cylinder and is moved in the axial direction thereof;

supporting the screen printing cylinder only in the region of its opposite end faces; and inflating the screen printing cylinder so strongly over at least one of these end faces by means of a compressed gas that the screen printing cylinder assumes a circular cross-section.

2. The method according to claim 1, wherein said inflating step comprises blowing compressed gas into the screen printing cylinder via both end faces.

3. The method according to claim 1, further comprising using air as the compressed gas in said inflating step.

4. The method according to claim 1, wherein said irradiating step comprises burning away the light responsive layer with the aid of the laser beam in order to partially expose a perforation of the screen printing cylinder for the purpose of producing a pattern.

5. The method according to claim 4, further comprising feeding a larger quantity of compressed gas to the screen printing cylinder as the exposed perforation of the screen printing cylinder increases.

6. The method according to claim 4, further comprising blowing sealing elements into the screen printing cylinder by means of the compressed gas in order to seal said cylinder in the region of the exposed perforation.

7. The method according to claim 6, further comprising employing at least one of laminated elements and spherical elements as the sealing elements in said blowing sealing elements step.

8. The method according to claim 6, further comprising using light-reflecting elements as the sealing elements.

9. The method according to claim 6, further comprising blowing, in addition to the sealing elements, at least one of a liquid medium and pulverulent medium into the screen printing cylinder.

10. The method according to claim 9, further comprising, after the producing of the pattern, removing the sealing elements and the liquid or pulverulent medium from the screen printing cylinder.

11. The method according to claim 6, further comprising, after the producing of the pattern, removing the sealing elements from the screen printing cylinder.

12. A device for producing a screen printing stencil, comprising:

a clamping device for rotatably clamping a screen printing cylinder having a light responsive layer on a surface thereof, the clamping device consists of only two centering flanges, of which in each case one can be inserted into one of end faces of the screen printing cylinder;

a laser which outputs a laser beam;

a carriage which can be moved parallel to the longitudinal direction of the screen printing cylinder and has a deflecting device which deflects the laser beam in such a way that the laser beam impinges at least approximately radially on the screen printing cylinder; and an internal duct connecting the screen printing cylinder in at least one of the centering flanges to a gas delivery device which generates a gas pressure in the interior of the screen printing cylinder such that the screen printing cylinder assumes a circular cross-section.

13. The device according to claim 12, further comprising internal ducts connecting the screen printing cylinder in both centering flanges to a corresponding gas delivery device.

14. The device according to claim 12, further comprising a reservoir situated in the flow path between the gas delivery device and the screen printing cylinder and sealing elements situated in the reservoir which are entrained by the delivered gas flow into the screen printing cylinder.

15. The device according to claim 14, further comprising a feeder device between the reservoir and the screen printing cylinder containing a liquid or pulverulent medium which is entrained by the flow to the screen printing cylinder.

16. The device according to claim 14, wherein the delivery direction of the gas delivery device can be reversed.

* * * * *